United States Patent
Combee

(10) Patent No.: US 8,080,999 B2
(45) Date of Patent: Dec. 20, 2011

(54) SENSOR CABLE FOR ELECTROMAGNETIC SURVEYING

(75) Inventor: Leendert Combee, Sandvika (NO)

(73) Assignee: WesternGeco L.L.C., Houston, TX (US)

( * ) Notice: Subject to any disclaimer, the term of this patent is extended or adjusted under 35 U.S.C. 154(b) by 556 days.

(21) Appl. No.: 12/168,128

(22) Filed: Jul. 5, 2008

(65) Prior Publication Data

US 2010/0001733 A1    Jan. 7, 2010

(51) Int. Cl.
*G01V 3/00*    (2006.01)
(52) U.S. Cl. .............................. 324/347; 324/334
(58) Field of Classification Search ................. 324/347, 324/334
See application file for complete search history.

(56) References Cited

U.S. PATENT DOCUMENTS

| | | | |
|---|---|---|---|
| 4,617,518 A | 10/1986 | Srnka | |
| 6,236,211 B1 | 5/2001 | Wynn | |
| 7,002,350 B1 | 2/2006 | Barringer | |
| 7,203,599 B1 | 4/2007 | Strack et al. | |
| 2005/0264294 A1 | 12/2005 | Constable | |
| 2006/0091889 A1 | 5/2006 | Ellingsrud et al. | |
| 2009/0295394 A1* | 12/2009 | Babour et al. | 324/350 |

FOREIGN PATENT DOCUMENTS

| | | |
|---|---|---|
| WO | 2005006022 A | 1/2005 |
| WO | 2005006022 A1 | 1/2005 |

OTHER PUBLICATIONS

Thompson, et al., Marine Geophysical Prospecting System, United States Statutory Invention Registration, Published Sep. 5, 1995, Registration No. H1490.
PCT Search Report, dated Jan. 26, 2010, Application No. PCT/US2009/049276.

* cited by examiner

*Primary Examiner* — Reena Aurora

(57) ABSTRACT

A sensor cable for surveying. The sensor cable has a housing, which includes one of more electrodes and a conductive gel surrounding the one or more electrodes. The conductive gel is configured to conduct electrical current to the one or more electrodes and keep the one or more electrodes moist. The housing may also have a membrane surrounding the conductive gel, wherein the membrane is configured to hold the conductive gel in contact with the one or more electrodes and permit electric current to flow between a surrounding medium and the conductive gel.

23 Claims, 4 Drawing Sheets

SENSOR CABLE FOR ELECTROMAGNETIC SURVEYING

BACKGROUND

1. Field of the Invention

Implementations of various technologies described herein generally relate to methods and systems for electromagnetic surveying.

2. Description of the Related Art

The following descriptions and examples are not admitted to be prior art by virtue of their inclusion within this section.

In recent years, electromagnetic surveying has been used for surveying subterranean hydrocarbon reservoirs. Typically, a number of electromagnetic sensors (receivers) are placed on a subsurface area along a tow line. A transmitter is then dragged over the receivers by a survey vessel, and the receivers record the resultant electromagnetic signal. Electric field and magnetic field information are recorded across several channels of frequency. An image of the subsurface area may then be generated based on the recorded signals. In some circumstances, it is beneficial to also tow the receivers from the survey vessel instead of placing the receivers on the subsurface area.

SUMMARY

Described herein are various technologies directed to a sensor cable for surveying. The sensor cable has a housing, which includes one of more electrodes and a conductive gel surrounding the one or more electrodes. The conductive gel is configured to conduct electrical current to the one or more electrodes and keep the one or more electrodes moist. The housing may also have a membrane surrounding the conductive gel, wherein the membrane is configured to hold the conductive gel in contact with the one or more electrodes and permit electric current to flow between a surrounding medium and the conductive gel.

Described herein are also various techniques directed to a method for making a sensor cable for electromagnetic surveying. The method may include removing a filler material from a section of the cable, thereby creating a housing, disposing an electrode inside the housing created by the removal of the filler material, coupling the electrode to a wire bundle running through the cable, disposing a conductive gel inside the housing such that the electrode is surrounded by the conductive gel and perforating a portion of an outer skin disposed outside the cable covering the housing.

Described herein are also various technologies directed to an electromagnetic survey system, which includes a vessel and a sensor cable attached to the vessel. The sensor cable has a housing, which includes an electrode and a conductive gel surrounding the electrode. The conductive gel is configured to conduct electrical current to the electrode and keep the electrode moist. The housing may further include a membrane surrounding the conductive gel. The membrane is configured to hold the conductive gel in contact with the electrode and permit electric current to flow between a surrounding medium and the conductive gel.

Described herein are also various techniques directed to a method for conducting an electromagnetic survey. The method includes deploying a sensor cable having two or more sensor housings. Each sensor housing comprises an electrode surrounded by a conductive gel. The method may further include applying an electromagnetic field to a subsurface area of the earth and recording an electric field strength of the electromagnetic field with the electrodes.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
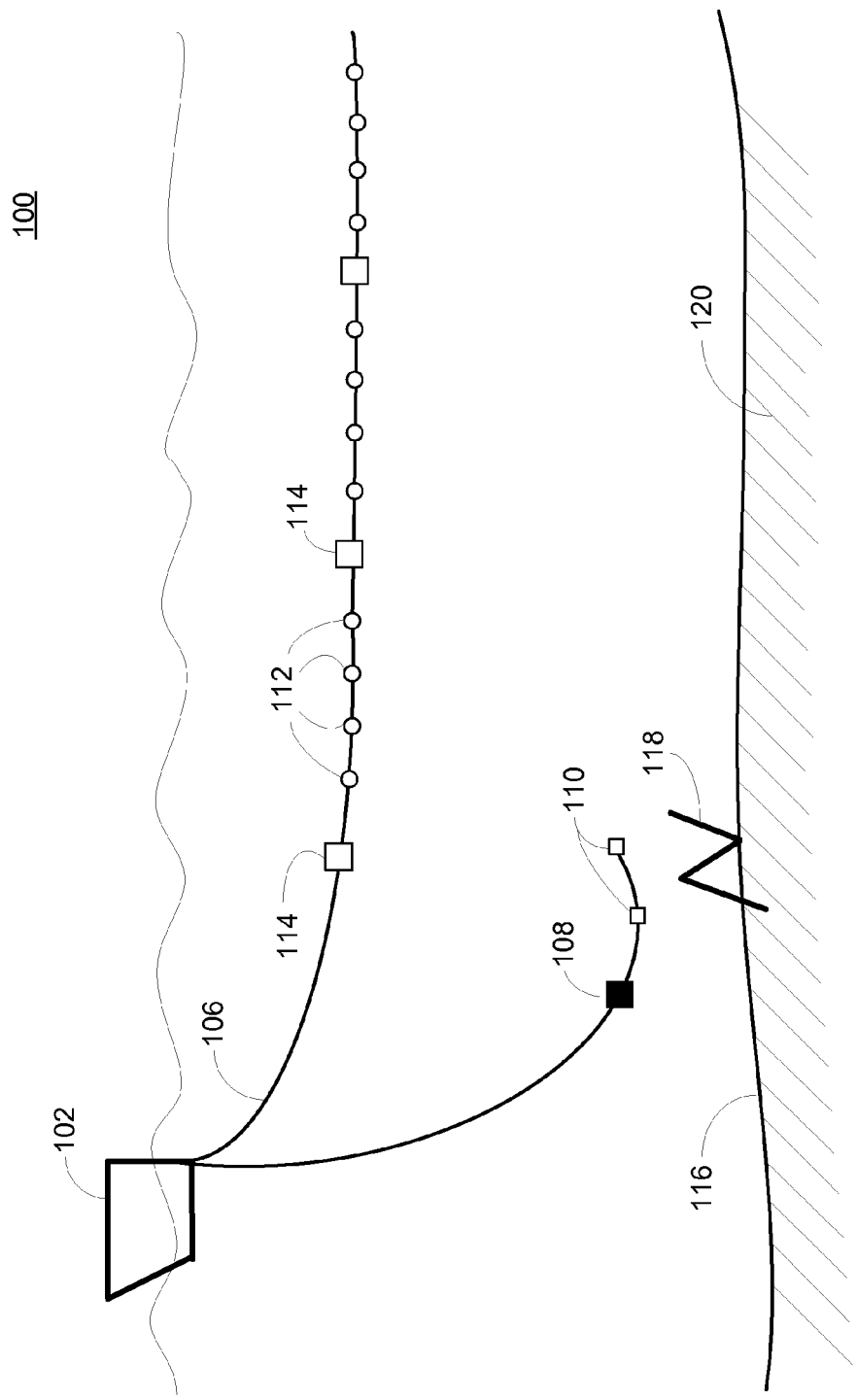
FIG. 1 illustrates a marine electromagnetic survey system in accordance with implementations of various technologies described herein.

FIG. 1 illustrates a marine electromagnetic survey system 100 in accordance with implementations of various technologies described herein. Marine electromagnetic surveying is normally performed by a survey vessel 102 that moves in a predetermined pattern along the surface of a body of water such as a lake, a sea or the ocean. The survey vessel 102 is configured to pull a towfish (source) 108, which is connected to a pair of electrodes 110.

At the source 108, a controlled electric current may be generated and sent through the electrodes 110 into the seawater. In one implementation, the electric current generated is in the range of about 0.1 Hz and about 10 Hz. The current creates an electromagnetic field 118 in the subsurface 120 to be surveyed.

The survey vessel 102 may also be configured to tow a sensor cable 106. The sensor cable 106 may be a marine towed cable. The sensor cable 106 may contain electrode sensor housings 112 and telemetry nodes 114. In one implementation, the sensor cable 106 may also have a bird (not shown) attached thereto. The bird may be used to provide information about the sensor cable 106 position. The sensor housings 112 may be part of a short cable insert section placed between the connectors of a standard towed or stationary cable segment. This insert section may be mechanically equivalent to a normal towed or stationary cable segment except that it is of short length.

The sensor housings 112 may contain electrodes for measuring the strength of the electric field 118 created in the subsurface area 120 during the surveying period. In one implementation, two electrodes, each located in a different sensor housing 112 form an electrical pair for measuring electric field strength.

The sensor housings 112 may be configured to communicate the electric field measurements to the telemetry nodes 114. The telemetry nodes 114 may contain circuitry configured to record the electric field measurements, which may be used in image processing of the subsurface area 120 at a later time.

Figure 2:
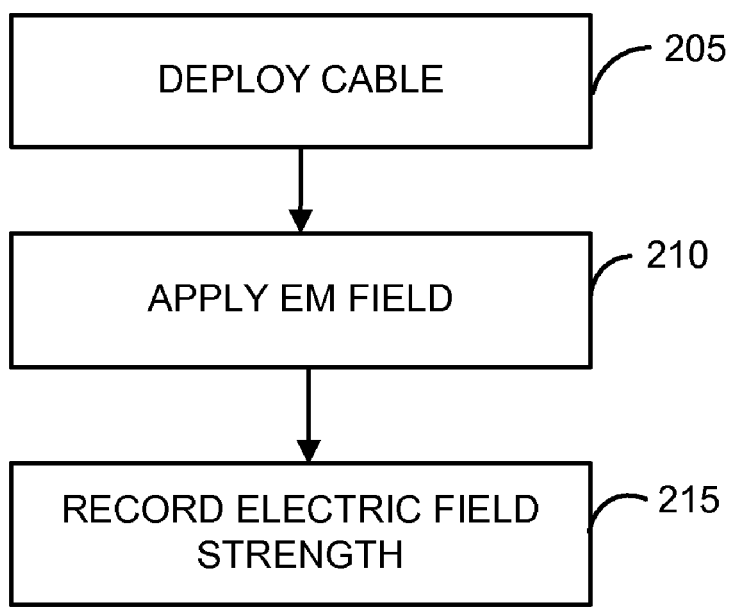
FIG. 2 illustrates a flow diagram of a method in accordance with implementations of various technologies described herein.

FIG. 2 illustrates a flow diagram of a method 200 in accordance with implementations of various technologies described herein. At step 205, the sensor cable 106 may be deployed. In one implementation, the survey vessel 102 may deploy the sensor cable 106 by towing the sensor cable 106 over the subsurface area 120 to be surveyed. In another implementation, the sensor cable 106 may be deployed by placing the sensor cable 106 on the seabed floor 116.

At step 210, the source 108 may apply an electromagnetic field to the subsurface area 120 being surveyed by generating an electric current that passes through the electrodes 110 into the seawater. In an implementation where the sensor cable 106 is placed on the seabed floor 116, the source 108 may be towed over the sensor cable 106.

At step 215, the strength of the electric field 118 may be recorded. In an implementation where the survey vessel 102 tows the sensor cable 106, the telemetry nodes 114 may record the electric field measurement detected by the electrodes within the sensor housings 112. In an implementation where the sensor cable 106 is deployed on the seabed 116, a recording buoy (not shown) attached to the sensor cable 106 may record the electric field measurement.

Figure 3:
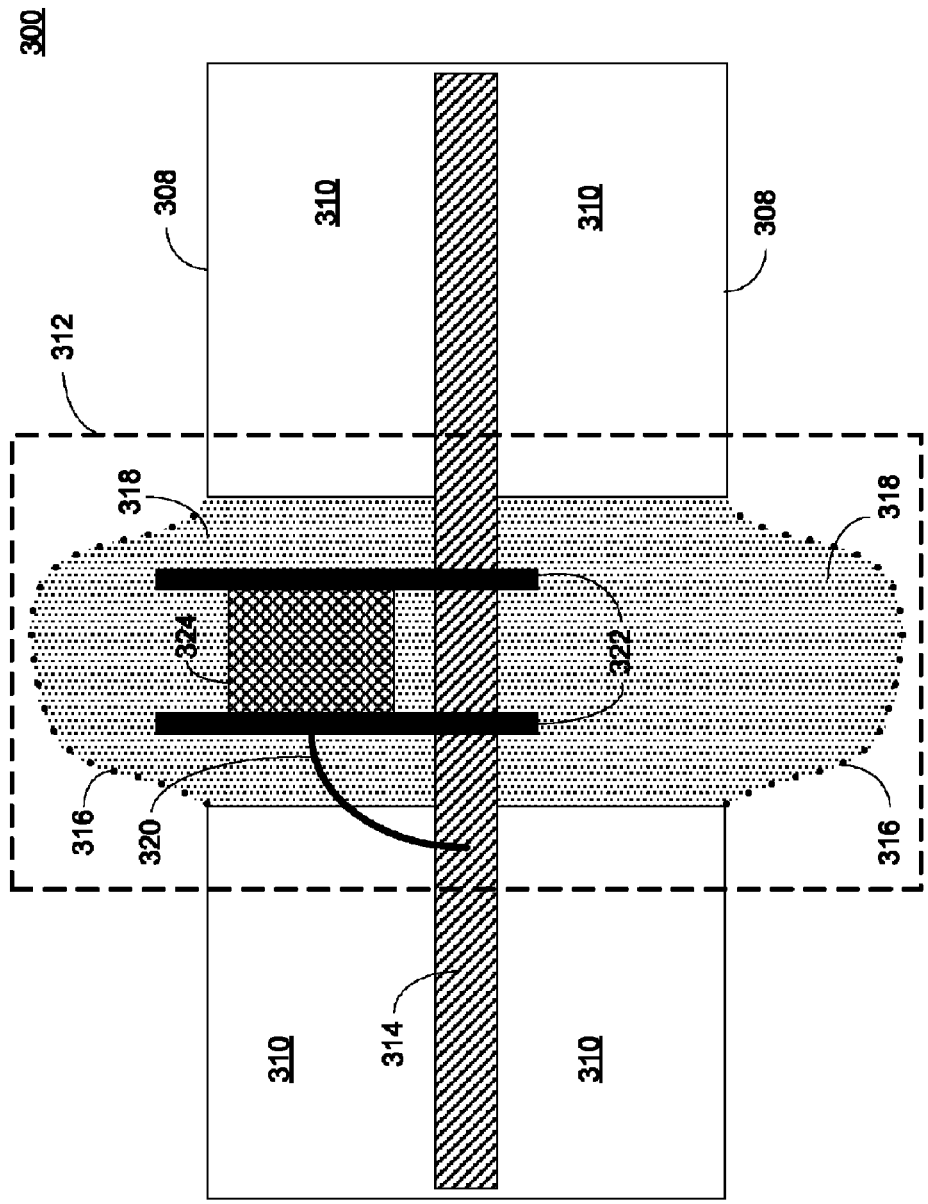
FIG. 3 illustrates a segment of a sensor cable in accordance with implementations of various technologies described herein.

FIG. 3 illustrates a segment 300 of the sensor cable 106 in accordance with implementations of various technologies described herein. The segment 300 includes an outer skin 308, a filler material 310, a wire bundle 314, and a sensor housing 312. The outer skin 308 may be made from materials used in standard marine towed or stationary cables. The filler material 310 is provided for robustness and buoyancy of the cable. The filler material 310 may be a fluid, such as isopar, a non-conductive gel material, or a solid non-conducting material. The wire bundle 314 may be a wire bundle commonly used in standard marine towed or stationary cables.

The sensor housing 312 may include a perforated (or porous) membrane 316, conductive gel 318, an electrical lead 320, and an electrode 324 attached to the wire bundle 314 by electrode holders 322. In one implementation, the electrode 324 may be made of silver-chloride, gold, or carbon. It should be noted that while only one electrode 324 is shown in the sensor housing 312, more than one electrode 324 may be contained inside the sensor housing 312.

In one implementation, the length of the sensor housing 312 may be between 10 centimeters (cm) and 1 meter (m). The perforated membrane 316 may be a section of the outer skin 308 that has been perforated to allow electric current to flow into and out of the sensor housing 312. While the perforations may consist of holes between 0.1 and 2 millimeters (mm) in diameter, the perforated membrane 316 may be configured to contain the conductive gel 318 and hold the conductive gel 318 in contact with the electrode 324.

As shown, the electrode 324 may be surrounded by the conductive gel 318. The conductive gel 318 may be configured to conduct electrical current to the electrode 324. In one implementation, the conductive gel 318 may include a non-conductive gel with conductive particles distributed throughout. For example, conductive nano-particles may be distributed within the conductive gel 318. In another example, the conductive gel 318 may consist of silver chloride particles dissolved in the gel while the gel is liquefied.

When not being used for surveys, the sensor cable 106 may be stored in a dry environment on cable drums. The electrode 324 may be a silver-chloride electrode that requires a moist environment to maintain its effectiveness for electric field measurement. As such, the conductive gel 318 may be configured to keep the electrode 324 moist. In one implementation, the conductive gel 318 may maintain a saline environment around the electrode 324 that does not evaporate while the sensor cable 106 is stored on cable drums.

The electrical lead 320 may connect the electrode 324 to the wire bundle 314 such that the electric field measurements of the electrode 324 may be communicated to the wire bundle. Further, the wire bundle 314 may be connected to the telemetry nodes 114, or the recording buoy, that record the electric field measurements communicated from the sensor housing 312.

Figure 4:
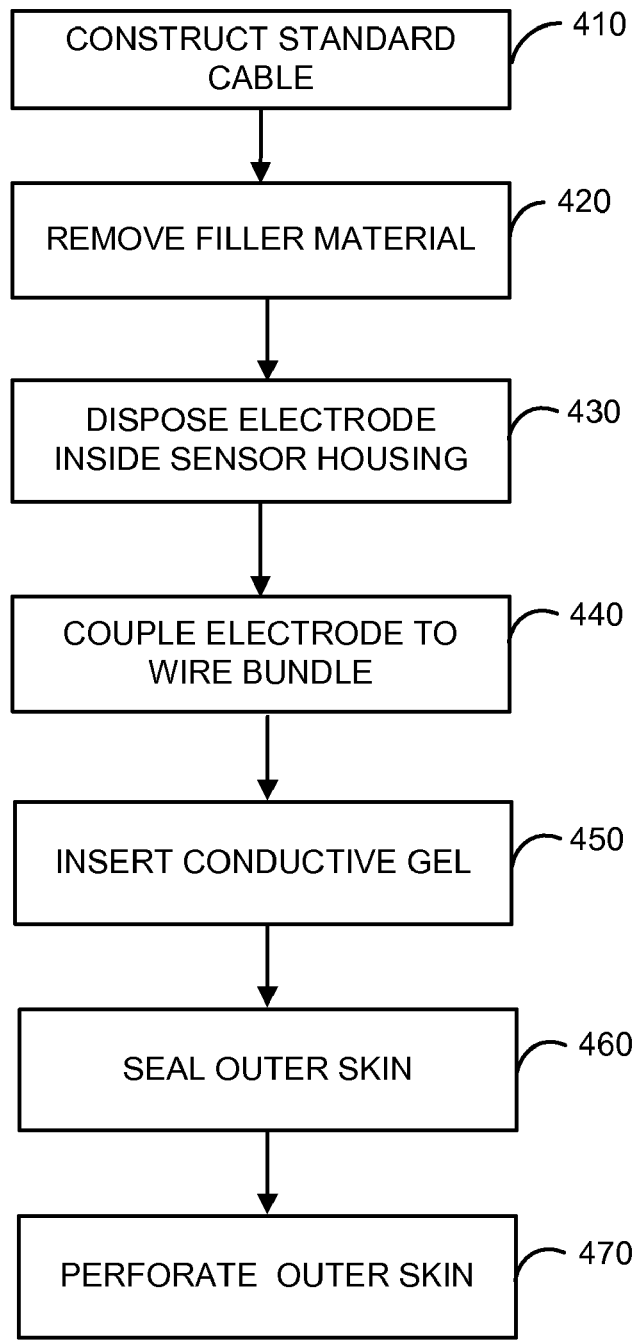
FIG. 4 illustrates a flow diagram for a method in accordance with implementations of various technologies described herein.

FIG. 4 illustrates a flow diagram of a method 400 for making a cable in accordance with implementations of various technologies described herein. At step 410, the sensor cable 106 may be constructed. The sensor cable 106 may be any standard towed marine or stationary cable. The sensor cable 106 may include the wire bundle 314, surrounded by the filler material 310, contained within the outer skin 308. The cable may be constructed out of segments of 100 m in length. Each cable segment may include other components, such as amplifiers, power lines, auxiliary wires, stress-members, etc. All of the cable segments may be combined into the sensor cable 106 that is between 4 and 15 kilometers (km) long.

At step 420, the filler material 310 may be removed from a section of the cable, thereby creating a space or a housing for the electrode(s). The sensor housing 312 may be from about 10 cm to about 1 m long. Further, the sensor housing 312 may be disposed every 50-200 meters along the length of the sensor cable 106. The filler material 310 may be a non-conductive gel such. As such, to remove the filler, the sensor housing 312 may be warmed until the gel in the area reaches a liquid state. A suction device may then be inserted into the area, and the liquefied gel may be withdrawn.

If the filler material 310 is a solid material, the outer skin 308 may be removed to facilitate removing the filler 310 within the sensor housing 312. The outer skin 308 may then be replaced over the sensor housing 312.

At step 430, one or more electrodes 324 may be disposed inside the sensor housing 312.

At step 440, the electrodes 324 may then be coupled to the wire bundle 314 via the electrical lead 320. The electrodes 324 may be coupled to the wire bundle 314 using electrode holders 322.

At step 450, the conductive gel 318 may be inserted into the space vacated by the removal of the filler material 310, i.e., the sensor housing 312. In one implementation, the conductive gel may be warmed to a liquefied state and then inserted under the outer skin 308 covering the sensor housing 312. In this manner, the electrodes 324 may be covered or surrounded by the conductive gel 318.

At step 460, the outer skin 308 that may have been punctured or ruptured due to the removal of the filler material 310 may be sealed. In the case where a non-conductive gel filler is removed at step 420, the same site used to withdraw the filler material 310 may also be used to insert the conductive gel 318. After insertion, the insertion site may be sealed.

At step 470, the outer skin 308 covering the sensor housing area may be perforated. The perforations may permit electric current to flow into, and out of, the sensor housing 312. In one implementation, the perforations consist of holes between 1 and 2 mm in size. The perforations may be further configured to contain the conductive gel 318 within the sensor housing 312 such that electric conductivity is maintained between the medium surrounding the sensor housing 312 and the electrodes 324 inside the sensor housing 312.

Steps 420-470 may be repeated for each sensor housing 312 disposed along the sensor cable 106.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A sensor cable for electromagnetic surveying, comprising:
    a housing comprising:
        one or more electrodes;
        a conductive gel surrounding the one or more electrodes, wherein the conductive gel is configured to conduct electrical current to the one or more electrodes and keep the one or more electrodes moist; and
        a membrane surrounding the conductive gel, wherein the membrane is configured to hold the conductive gel in contact with the one or more electrodes and permit electric current to flow between a surrounding medium and the conductive gel.

2. The sensor cable of claim 1, wherein the conductive gel comprises dissolved silver chloride particles.

3. The sensor cable of claim 1, wherein the conductive gel comprises conductive nano-particles.

4. The sensor cable of claim 1, wherein the membrane is perforated with holes with diameters from about 0.1 mm to about 2 mm.

5. A sensor cable for electromagnetic surveying, comprising:
    a first housing comprising:
        a first electrode;
        a first conductive gel surrounding the first electrode, wherein the first conductive gel is configured to conduct electrical current to the first electrode and keep the first electrode moist; and
        a first membrane surrounding the first conductive gel, wherein the first membrane is configured to hold the first conductive gel in contact with the first electrode and permit electric current to flow between a surrounding medium and the first conductive gel.

6. The sensor cable of claim 5, wherein the first conductive gel comprises dissolved silver chloride particles.

7. The sensor cable of claim 5, wherein the first conductive gel comprises conductive nano-particles.

8. The sensor cable of claim 5, wherein the first membrane is perforated with holes with diameters from about 1 mm to about 2 mm.

9. The sensor cable of claim 5, further comprising a second housing disposed a distance from the first housing along the tow cable, comprising:
    a second electrode that forms an electrical pair with the first electrode;
    a second conductive gel surrounding the second electrode, wherein the second conductive gel is configured to conduct electrical current to the second electrode and keep the second electrode moist; and
    a second membrane surrounding the second conductive gel, wherein the second membrane is configured to hold the second conductive gel in contact with the second electrode and permit the electric current to flow between the surrounding medium and the second conductive gel.

10. A method for making a sensor cable for electromagnetic surveying, comprising:
    removing a filler material from a section of the cable, thereby creating a housing;
    disposing an electrode inside the housing created by the removal of the filler material,
    coupling the electrode to a wire bundle running through the cable;
    disposing a conductive gel inside the housing such that the electrode is surrounded by the conductive gel; and
    perforating a portion of an outer skin disposed outside the cable covering the housing.

11. The method of claim 10, wherein the filler material is a non-conductive gel and wherein removing the filler material comprises:
    warming the non-conductive gel into a liquid state; and
    removing the liquefied gel.

12. An electromagnetic survey system, comprising:
    a vessel; and
    a sensor cable attached to the vessel and wherein the sensor cable comprises:
        a housing comprising:
            an electrode;
            a conductive gel surrounding the electrode, wherein the conductive gel is configured to conduct electrical current to the electrode and keep the electrode moist; and
            a membrane surrounding the conductive gel, wherein the membrane is configured to hold the conductive gel in contact with the electrode and permit electric current to flow between a surrounding medium and the conductive gel.

13. The electromagnetic survey system of claim 12, wherein the conductive gel comprises dissolved silver chloride particles.

14. The electromagnetic survey system of claim 12, wherein the conductive gel comprises conductive nano-particles.

15. The electromagnetic survey system of claim 12, wherein the membrane is perforated with holes with diameters from about 1 mm to about 2 mm.

16. A method for conducting an electromagnetic survey, comprising:
    deploying a sensor cable having two or more sensor housings, each sensor housing comprises an electrode surrounded by a conductive gel;
    applying an electromagnetic field to a subsurface area of the earth; and
    recording an electric field strength of the electromagnetic field with the electrode.

17. The method of claim 16, wherein each sensor housing further comprises a perforated membrane surrounding the conductive gel, wherein the perforated membrane is configured to hold the conductive gel in contact with electrode.

18. The method of claim 17, wherein the perforated membrane is further configured to permit electric current to flow between a surrounding medium and the conductive gel.

19. The method of claim 16, wherein the conductive gel is configured to conduct electrical current to the electrode and keep the electrode moist.

20. The method of claim 16, wherein deploying the sensor cable comprises towing the sensor cable over the subsurface area to be surveyed.

21. The method of claim 16, wherein deploying the sensor cable comprises placing the sensor cable on a seabed over the subsurface area to be surveyed.

22. The method of claim 16, wherein the two or more sensor housings are disposed along the sensor cable in intervals between about 50 and about 200 meters.

23. The method of claim 16, wherein the two or more sensor housings are between about 10 centimeters and about one meter in length.

* * * * *